United States Patent
Veenstra et al.

(10) Patent No.: US 10,619,794 B2
(45) Date of Patent: Apr. 14, 2020

(54) PRESSURIZED-FLUID STORAGE DEVICE

(71) Applicant: FORD GLOBAL TECHNOLOGIES, LLC, Dearborn, MI (US)

(72) Inventors: Michael J. Veenstra, Southgate, MI (US); Bert Hobein, Aachen (DE); Stella Papasavva, Royal Oak, MI (US); Julio Orozco Santos Coy, Aachen (DE); Justin Purewal, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 63 days.

(21) Appl. No.: 15/919,937

(22) Filed: Mar. 13, 2018

(65) Prior Publication Data
US 2019/0285227 A1    Sep. 19, 2019

(51) Int. Cl.
*F17C 1/02*    (2006.01)

(52) U.S. Cl.
CPC ........ *F17C 1/02* (2013.01); *F17C 2201/0109* (2013.01); *F17C 2203/012* (2013.01); *F17C 2203/013* (2013.01); *F17C 2203/0604* (2013.01); *F17C 2203/066* (2013.01); *F17C 2203/0621* (2013.01); *F17C 2203/0639* (2013.01); *F17C 2203/0646* (2013.01); *F17C 2203/0648* (2013.01); *F17C 2203/0673* (2013.01); *F17C 2205/0305* (2013.01); *F17C 2221/012* (2013.01); *F17C 2270/0184* (2013.01)

(58) Field of Classification Search
CPC ............................ F17C 1/02; F17C 2203/013; F17C 2221/012; F17C 2270/0184; F17C 2203/0648; F17C 2203/0639; F17C 2203/0646; F17C 2203/066; F17C 2203/0604; F17C 2205/0305; F17C 2201/0109; F17C 2203/0673; F17C 2203/0621; F17C 2203/012
See application file for complete search history.

(56) References Cited

U.S. PATENT DOCUMENTS

| | | | | |
|---|---|---|---|---|
| 2,995,011 A | * | 8/1961 | Kimmel | F02K 9/34 60/255 |
| 3,282,757 A | * | 11/1966 | Brussee | B29C 70/86 156/69 |
| 3,321,101 A | * | 5/1967 | Griffith | C08G 59/5033 220/590 |
| 3,785,040 A | * | 1/1974 | Pechacek | B21D 51/24 29/447 |

(Continued)

FOREIGN PATENT DOCUMENTS

| WO | 2011028401 A3 | 3/2011 |
|---|---|---|
| WO | 2017091613 A1 | 6/2017 |

*Primary Examiner* — Kareen K Thomas
(74) *Attorney, Agent, or Firm* — David Kelley; Brooks Kushman P.C.

(57) ABSTRACT

A pressure vessel includes a shell, a first boss, a second boss, and a reinforcement support. The shell defines an internal cavity. The first and second bosses are disposed within the cavity and respectively extend through opposing longitudinal ends of the shell. The first boss defines a longitudinally extending central orifice. The reinforcement support is disposed within the cavity, is secured to the first boss radially outward of the central orifice, extends from the first boss to the second boss, and is secured to the second boss.

19 Claims, 3 Drawing Sheets

(56) References Cited

U.S. PATENT DOCUMENTS

| | | | | |
|---|---|---|---|---|
| 4,699,288 A | * | 10/1987 | Mohan | B29C 53/602 |
| | | | | 220/560.01 |
| 7,169,214 B2 | * | 1/2007 | Kubo | F17C 1/00 |
| | | | | 220/582 |
| 8,038,029 B2 | * | 10/2011 | Lindner | B29C 70/32 |
| | | | | 220/588 |
| 8,047,396 B2 | * | 11/2011 | Jenkins | F17C 13/06 |
| | | | | 220/581 |
| 8,397,938 B2 | * | 3/2013 | Strack | F16J 12/00 |
| | | | | 220/582 |
| 8,464,893 B2 | * | 6/2013 | Iida | B29C 70/086 |
| | | | | 156/156 |
| 8,657,146 B2 | * | 2/2014 | Schultheis | F16J 12/00 |
| | | | | 206/0.6 |
| 2004/0108319 A1 | | 6/2004 | Bettinger | |

* cited by examiner

(12)	United States Patent

PRESSURIZED-FLUID STORAGE DEVICE

TECHNICAL FIELD

The present disclosure relates to pressure vessels, including pressure vessels that store hydrogen in vehicles that utilize fuel cells as a power source.

BACKGROUND

Pressure vessels may be utilized to store pressurized fluids, including pressurized materials that are in a gas and/or liquid phase.

SUMMARY

A pressure vessel includes a shell, a first boss, a second boss, and a reinforcement support. The shell defines an internal cavity. The first and second bosses are disposed within the cavity and respectively extend through opposing longitudinal ends of the shell. The first boss defines a longitudinally extending central orifice. The reinforcement support is disposed within the cavity, is secured to the first boss radially outward of the central orifice, extends from the first boss to the second boss, and is secured to the second boss.

A pressure vessel includes a shell, a first boss, and a reinforcement support. The shell defines an internal cavity. The first boss is disposed within the cavity, extends through a first longitudinal end of the shell, and defines a longitudinally extending central orifice. The reinforcement support is disposed within the cavity, is secured to the first boss radially outward of the central orifice, and extends from the first boss to a second longitudinal end of the shell.

A pressurized-fluid storage device includes an internal shell, a reinforcement layer, a first boss, a second boss, and a reinforcement support. The internal shell defines an internal cavity. The reinforcement layer is disposed around the internal shell. The first and second bosses are disposed within the cavity at opposing longitudinal ends of the internal shell. The first boss defines a longitudinally extending central orifice. The reinforcement support is disposed within the cavity, is secured to the first boss radially outward of the central orifice, and extends from the first boss to the second boss.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Alternative fuel vehicles, such as natural gas and hydrogen vehicles, require high pressure storage tanks (i.e., pressure vessels) for their respective gaseous fuels. This is necessary to increase the on-board capacity to a density that approaches an equivalent driving range in comparison to conventional gasoline vehicles. To increase storage density, natural gas is pressurized to 250 bar and hydrogen is pressurized to 700 bar in the pressure storage tanks. To reduce the weight of these pressure vessels, the tanks are manufactured with high strength but lightweight materials, such as carbon fiber composites. The extensive composite reinforcement of the tank results in an effective design for strength and weight. However, the cost of the pressure vessel is relatively high due to the amount of carbon fiber material required to manufacture the composite reinforcement of the tank. This disclosure provides an alternative tank design that enables lower cost by reducing the amount of composite material while maintaining the high-pressure tank functionality.

Figure 1:
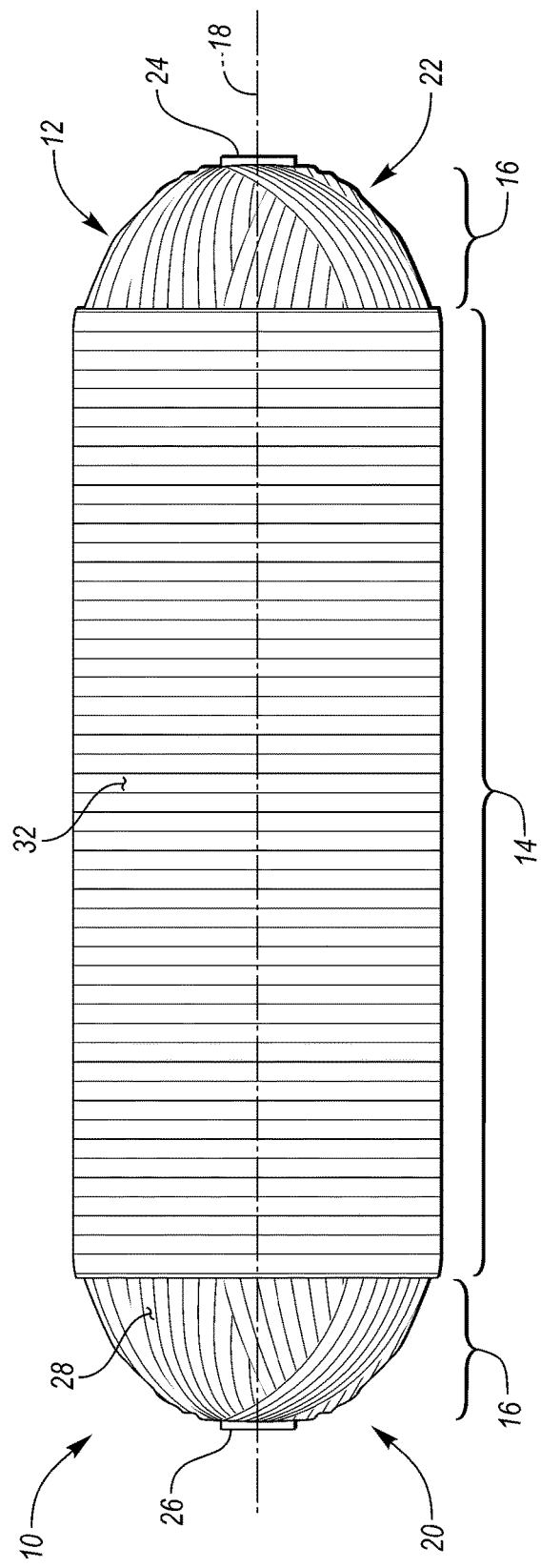
FIG. 1 is a front view of a pressure vessel.

Referring to FIG. 1, a front view of a pressure vessel 10 is illustrated. A pressure vessel is a device that is configured to store pressurized fluids, including gases and liquids. The pressure vessel 10 may include a shell 12 that defines an internal cavity (not shown in FIG. 1) to store the pressurized fluids. The shell 12 may include a cylindrical central region 14 that is disposed between two hemispherical dome regions 16 along a longitudinal axis 18. The two hemispherical dome regions 16 may be disposed at opposing ends 20, 22 of the shell 12 along the longitudinal axis 18. The opposing ends 20, 22 may also be referred to as the first longitudinal end 20 of the shell 12 (or first longitudinal end 20 of the pressure vessel 10) and the second longitudinal end 22 of the shell 12 (or second longitudinal end 22 of the pressure vessel 10). A first end boss 24 may extend through the first end 20 of the shell 12. A second end boss 26 may extend through the second end 22 of the shell 12. A boss may refer to a projection or protuberance on a casting or forging.

Figure 2:
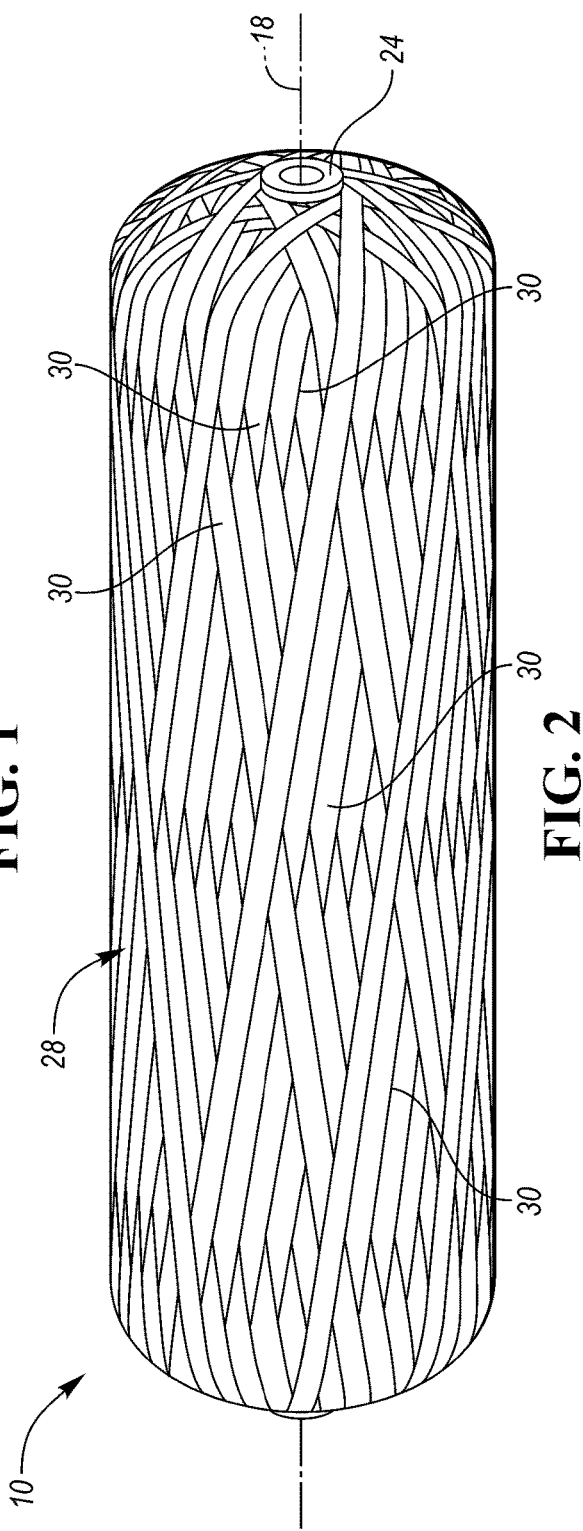
FIG. 2 is a perspective view of the pressure vessel with an outer layer of the shell removed.

Referring now to FIGS. 1 and 2, a front view of the pressure vessel 10 and a perspective view of the pressure vessel 10 with an outer layer of the shell 12 removed are illustrated, respectively. The shell 12 may comprise several layers. The inner most layer (not shown in FIG. 1 or 2) may be referred to as a liner or an internal shell. One or more reinforcement layers may be disposed over the liner. The reinforcement layers may include filaments that are wound in a distinct pattern around the liner. The filaments may be made from a unidirectional strength carbon fiber material. The reinforcement structure, however, is not limited to a carbon fiber construction and may made from any type of composite material such as a fiber-reinforced plastic. Fiber-reinforced plastics (also known as fiber-reinforced polymers) are composite materials made of a polymer matrix reinforced with fibers. The fibers may be glass, carbon, basalt, aramid or other appropriate reinforcing materials. The polymer may be an epoxy, vinylester, polyester thermosetting plastic, phenol formaldehyde resin, or other appropriate polymer or plastic. Fiber-reinforced plastics may also be heat and/or pressure cured.

The pressure vessel 10 may include a first reinforcement layer 28, which may be referred to as the helical winding layer. The first reinforcement layer 28 may be disposed directly over the liner or internal shell of the pressure vessel 10. The first reinforcement layer 28 includes individual windings 30 of material that span and wrap around the two hemispherical dome regions 16. The first reinforcement layer 28 is configured to strengthen the pressure vessel 10 in the direction of the longitudinal axis 18 to counteract stresses applied to the two hemispherical dome regions 16 from the pressurized fluids being stored within the pressure vessel 10. The individual windings 30 of the first reinforcement layers may be orientated anywhere between 10° and 70° with respect to the longitudinal axis 18.

The pressure vessel 10 may include a second reinforcement layer 32, which may be referred to as the hoop winding layer. The second reinforcement layer 32 includes windings of material that wrap around the cylindrical central region 14 of the pressure vessel that are perpendicular to the longitudinal axis 18. The second reinforcement layer 32 may be disposed directly over the first reinforcement layer 28. The second reinforcement layer 32 is configured to strengthen the pressure vessel 10 in the direction that is perpendicular to the longitudinal axis 18. More specifically, the second reinforcement layer 32 is configured to counteract stresses, which may be referred to as the "hoop stresses," applied to the cylindrical central region 14 of the pressure vessel.

Figure 3:
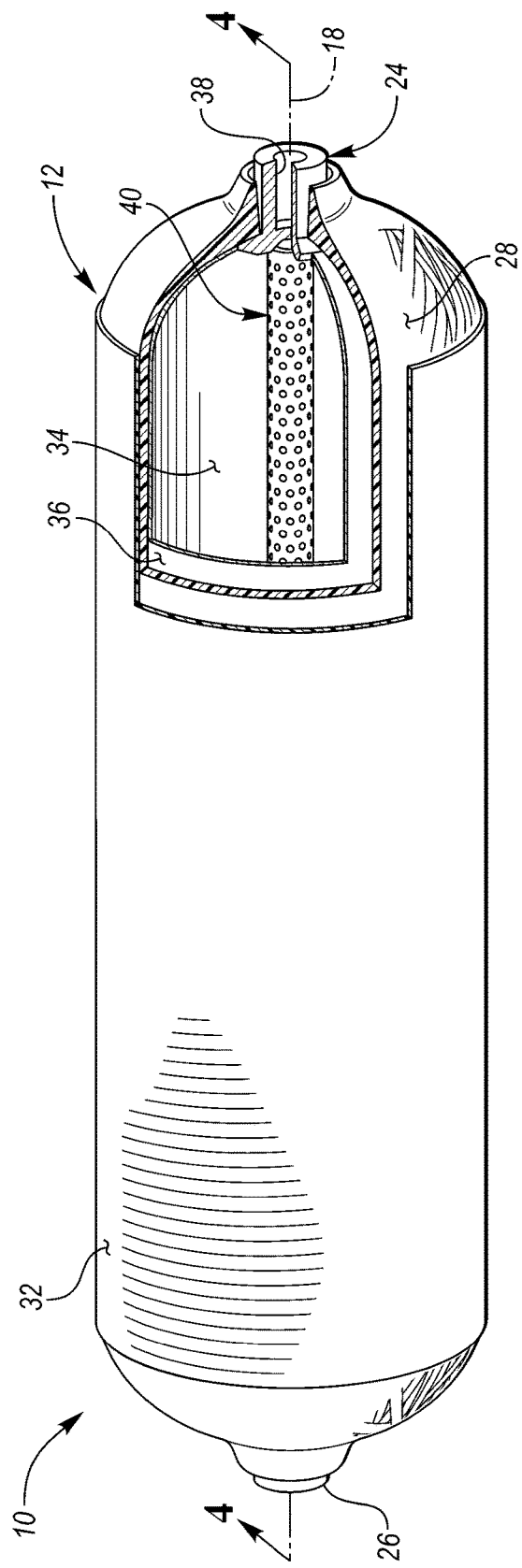
FIG. 3 is a cut-away view of a first embodiment of the pressure vessel.
Figure 4:
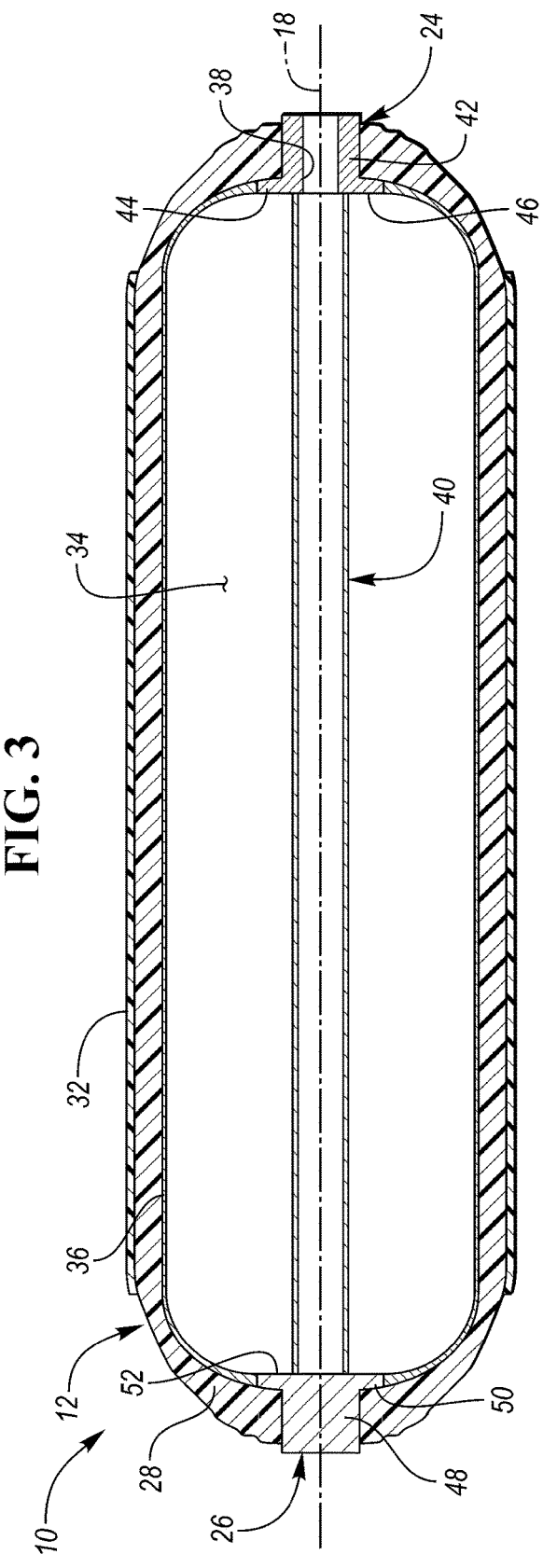
FIG. 4 is a cross-sectional view taken along line 4-4 in FIG. 3.

Referring to FIGS. 3 and 4 a first embodiment of the pressure vessel 10 is illustrated. The shell 12 defines an internal cavity 34. More specifically, the inner most layer of the shell 12, which may be referred to as the internal shell or liner 36, defines the internal cavity 34. The first boss 24 and the second boss 26 are disposed within the cavity 34. The first boss 24 and the second boss 26 respectively extend through the opposing longitudinal ends 20, 22 of the shell 12. The first boss 24 defines a longitudinally extending central orifice 38. The central orifice may be a tapped hole that is configured to receive a threaded fitting or fluid connection, such as a pipe or tube. Alternatively, the first boss 24 may include external threading that is configured to receive a threaded fitting or fluid connection.

A reinforcement support 40 may be disposed within the cavity 34. The reinforcement support 40 may be secured to the first boss 34 radially outward of the central orifice 38. Radially outward may refer to a direction that is perpendicular to and away from the longitudinal axis 18. The reinforcement support 40 may extending from the first boss 24 to the second boss 26. Alternatively stated, the reinforcement support 40 may extend from the first longitudinal end 20 of the shell 12 to the second longitudinal end 22 of the shell 12, or vice versa. The reinforcement support 40 may also be secured to the second boss 26.

The liner 36, the first end boss 24, the second end boss 26, and the reinforcement structure 40 may be may be made from a metallic or plastic material, such as steel, aluminum, magnesium, titanium, thermoplastics, thermoset plastics/polymers, or any other metal, metal alloy, or plastic material. The reinforcement support 40 may be secured to the first boss 24 and the second boss 26 by any joining process, such as welding or threads. Alternatively, the reinforcement support 40 may be an integral portion of a single component that includes the first boss 24, the second boss, and the reinforcement structure 40.

The reinforcement support 40 depicted in the embodiment of FIG. 1, is shown to be a hollow cylinder that extends between the first boss 24 and the second boss 26. The hollow cylinder the comprises the reinforcement support 40 is shown to have a circular cross-sectional area, however, it should be understood that the hollow cylinder may have any cross-sectional shape that is closed around an open space. The hollow cylinder that comprises the reinforcement support 40 may include holes or perforations such that the cavity 34 is in fluid communication with the central orifice 38.

The first boss 24 includes a longitudinally extending (i.e., extending along the longitudinal axis 18) protrusion 42 that defines the central orifice 38. The first boss 24 also includes a flange 44 that extends radially outward (i.e., extends outward in a direction perpendicular to the longitudinal axis 18) from the longitudinally extending protrusion 42 within the cavity 32. The longitudinally extending protrusion 42 and the flange 44 define an internal surface 46 that partially defines the cavity 34. The reinforcement support 40 may be secured to the internal surface 46 radially inward (i.e., inward in a direction perpendicular to the longitudinal axis 18) from the flange 44 and adjacent to the longitudinally extending protrusion 42. Securing the reinforcement support 40 to the first boss 24 adjacent to the longitudinally extending protrusion 42, as opposed to adjacent to the flange 44, will increase the structural strength of the pressure vessel 10 in the direction along the longitudinal axis 18 since the longitudinally extending protrusion 42 is thicker than the flange 44 in the longitudinal direction.

The second boss 26 includes a second longitudinally extending (i.e., extending along the longitudinal axis 18) protrusion 48. The second longitudinally extending protrusion 48 may or may not define a longitudinally extending central orifice that is similar to the central orifice 38 defined by the first boss 24. The second boss 26 also includes a second flange 50 that extends radially outward (i.e., extends outward in a direction perpendicular to the longitudinal axis 18) from the second longitudinally extending protrusion 48 within the cavity 32. The second longitudinally extending protrusion 48 and the second flange 50 define a second internal surface 52 that also partially defines the cavity 34. The reinforcement support 40 may be secured to the second internal surface 52 radially inward (i.e., inward in a direction perpendicular to the longitudinal axis 18) from the second flange 50. If the second longitudinally extending protrusion 48 were to also define a longitudinally extending central orifice, the reinforcement support 40 would be secured to the second internal surface 52 radially outward from the central orifice. Securing the second reinforcement support 40 to the second boss 26 adjacent to the second longitudinally extending protrusion 48, as opposed to adjacent to the second flange 50, will increase the structural strength of the pressure vessel 10 in the direction along the longitudinal axis 18 since the second longitudinally extending protrusion 48 is thicker than the second flange 50 in the longitudinal direction.

Figure 5:
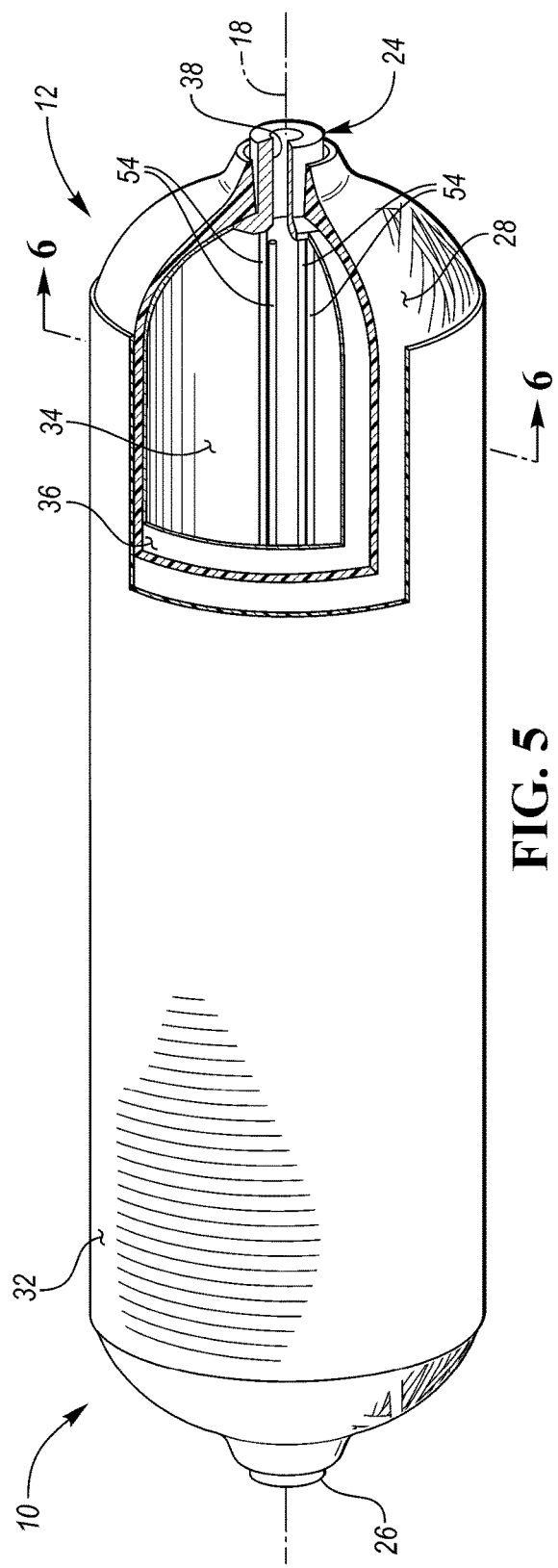
FIG. 5 is a cut-away view of a second embodiment of the pressure vessel.
Figure 6:
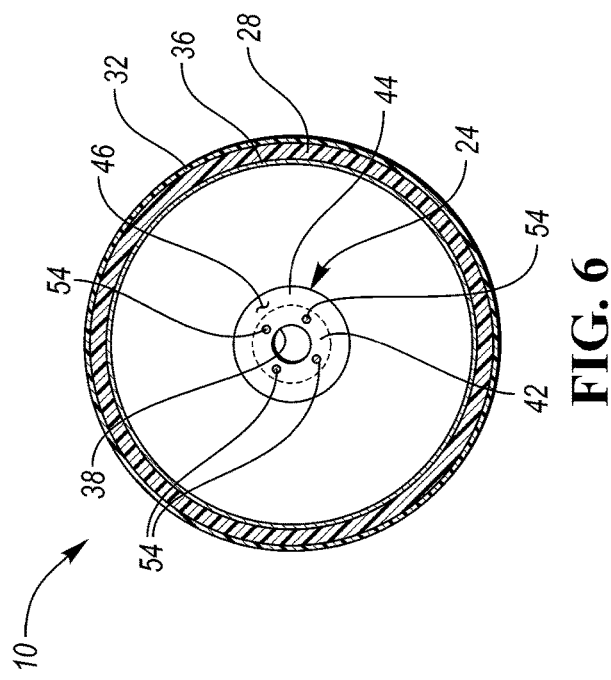
FIG. 6 is a cross-sectional view taken along line 6-6 in FIG. 5.

Referring to FIGS. 5 and 6 a second embodiment of the pressure vessel 10 is illustrated. The second embodiment of the pressure vessel 10 is similar to the first embodiment of the pressure vessel 10 depicted in FIGS. 3 and 4 with the exception that the reinforcement support comprises a plurality of reinforcement bars 54. The reinforcement bars 54 extend between and are secured to each of the first boss 24 and the second boss 26. The reinforcement bars 54 may be secured to the internal surface 46 of the first boss 24 radially outward of the central orifice 38 and radially inward of the flange 44. The reinforcement bars 54 may also be secured to the second internal surface 52 of the second boss 26 radially inward of the second flange 50 (and radially outward of a central orifice if such an orifice is defined by the second boss 26). Although exactly four reinforcement bars 54 are depicted, it should be understood that the second embodiment of the pressure vessel 10 may include two or more reinforcement bars 54. The reinforcement bars 54 may be spaced equidistantly around the first boss 24, or more specifically may be spaced equidistantly around the central orifice 38. The reinforcement bars 54 may be may be made from a metallic or plastic material, such as steel, aluminum, magnesium, titanium, thermoplastics, thermoset plastics/polymers, or any other metal, metal alloy, or plastic material.

Including reinforcement structures (i.e., reinforcement structure 40 and reinforcement bars 54) that extend within a cavity of a pressure vessel and between bosses on opposing sides of the pressure vessel, increases the structural integrity of the pressure vessel and decreases the amount of expensive carbon fiber and/or composite material that is required to construct the external helical layer (i.e., the first reinforcement layer 28) of the pressure vessel.

Furthermore, positioning the reinforcement structure (e.g., reinforcement structure 40 and reinforcement bars 54) radially outward of the central orifice 38 prevents the reinforcement structure from interfering with a sensor (e.g., temperature or pressure sensor), valve, fitting, or other attachment this is secured the boss and also extends into central orifice 38 and/or internal cavity 34 of the pressure vessel 10. This is especially true if the central orifice 38 is a tapped hole and the sensor, valve, fitting, or other attachment is threaded into the tapped hole.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A pressure vessel:
   a shell defining an internal cavity;
   first and second bosses disposed within the cavity and respectively extending through opposing longitudinal ends of the shell, the first boss defining a longitudinally extending central orifice; and
   a reinforcement support disposed within the cavity, secured to the first boss radially outward of the central orifice, extending from the first boss to the second boss, and secured to the second boss, wherein the reinforcement support includes a plurality of reinforcement bars that extend from the first boss to the second boss.

2. The pressure vessel of claim 1, wherein the first boss includes a longitudinally extending protrusion that defines the central orifice and a flange that extends radially outward from the longitudinally extending protrusion within the cavity.

3. The pressure vessel of claim 2, wherein the longitudinally extending protrusion and the flange define an internal surface that partially defines the cavity, and wherein the reinforcement support is secured to the internal surface radially inward from the flange.

4. The pressure vessel of claim 1, wherein the second boss includes a longitudinally extending protrusion and a flange that extends radially outward from the longitudinally extending protrusion within the cavity.

5. The pressure vessel of claim 4, wherein the longitudinally extending protrusion and the flange define an internal surface that partially defines the cavity, and wherein the reinforcement support is secured to the internal surface radially inward from the flange.

6. The pressure vessel of claim 1, wherein the reinforcement support includes a hollow cylinder that extends from the first boss to the second boss.

7. The pressure vessel of claim 1, wherein the plurality of reinforcement bars is radially spaced equidistantly around the central orifice.

8. A pressure vessel comprising:
   a shell defining an internal cavity;
   a first boss disposed within the cavity, extending through a first longitudinal end of the shell, and defining a longitudinally extending central orifice; and
   a reinforcement support disposed within the cavity, secured to the first boss radially outward of the central orifice, and extending from the first boss to a second longitudinal end of the shell, wherein the reinforcement support includes a plurality of reinforcement bars that extend from the first boss to the second boss.

9. The pressure vessel of claim 8, wherein the first boss includes a longitudinally extending protrusion that defines the central orifice and a flange that extends radially outward from the longitudinally extending protrusion within the cavity.

10. The pressure vessel of claim 9, wherein the longitudinally extending protrusion and the flange define an internal surface that partially defines the cavity, and wherein the reinforcement support is secured to the internal surface radially inward from the flange.

11. The pressure vessel of claim 8 further comprising a second boss disposed within the cavity and extending through a second longitudinal end of the shell that is opposite the first longitudinal end.

12. The pressure vessel of claim 11, wherein the second boss includes a longitudinally extending protrusion and a flange that extends radially outward from the longitudinally extending protrusion within the cavity.

13. The pressure vessel of claim 12, wherein the longitudinally extending protrusion and the flange define an internal surface that partially defines the cavity, and wherein the reinforcement support is secured to the internal surface radially inward from the flange.

14. The pressure vessel of claim 8, wherein the reinforcement support includes a hollow cylinder that extends from the first boss to the second boss.

15. The pressure vessel of claim 8, wherein the plurality of reinforcement bars is radially spaced equidistantly around the central orifice.

16. A pressurized-fluid storage device comprising:
   a shell defining an internal cavity;
   first and second bosses disposed within the cavity at opposing longitudinal ends of the shell, the first and second bosses having first and second internal surfaces, respectively, that are oriented such that the first internal surface faces the second internal surface within the cavity, and the first boss defining a longitudinally extending central orifice that a extends from the first internal surface to an exterior of the shell; and a reinforcement support disposed within the cavity, secured to first internal surface of the first boss radially outward of the central orifice, extending from the first boss to the second boss, and secured to the second internal surface of the second boss.

17. The pressurized-fluid storage device of claim 16, wherein the first boss includes a longitudinally extending protrusion that defines the central orifice and a flange that extends radially outward from the longitudinally extending protrusion within the cavity.

18. The pressurized-fluid storage device of claim 17, wherein the longitudinally extending protrusion and the flange define an internal surface that partially defines the cavity, and wherein the reinforcement support is secured to the internal surface radially inward from the flange.

19. The pressurized-fluid storage device of claim 16, wherein the reinforcement support includes a plurality of reinforcement bars that extend from the first boss to the second boss.

* * * * *